US011037412B2

(12) United States Patent
Yepez

(10) Patent No.: US 11,037,412 B2
(45) Date of Patent: Jun. 15, 2021

(54) TRANSACTION TERMINAL WITH VERTICAL WEIGH SCALE AND METHODS OF OPERATION

(71) Applicant: NCR Corporation, Atlanta, GA (US)

(72) Inventor: Rafael Yepez, Duluth, GA (US)

(73) Assignee: NCR Corporation, Atlanta, GA (US)

( * ) Notice: Subject to any disclaimer, the term of this patent is extended or adjusted under 35 U.S.C. 154(b) by 0 days.

(21) Appl. No.: 16/664,385

(22) Filed: Oct. 25, 2019

(65) Prior Publication Data

US 2021/0125467 A1 Apr. 29, 2021

(51) Int. Cl.
*G07G 1/00* (2006.01)
*G01G 23/10* (2006.01)
*G01G 19/414* (2006.01)
*G01G 23/37* (2006.01)

(52) U.S. Cl.
CPC ....... *G07G 1/0072* (2013.01); *G01G 19/4144* (2013.01); *G01G 23/10* (2013.01); *G01G 23/3721* (2013.01)

(58) Field of Classification Search
CPC ............ G07G 1/0072; G01G 23/3721; G01G 19/4144; G01G 23/10
See application file for complete search history.

(56) References Cited

U.S. PATENT DOCUMENTS

| 5,143,164 A * | 9/1992 | Nahar | G01G 19/4144 177/25.15 |
| 5,437,346 A * | 8/1995 | Dumont | A47F 9/042 186/61 |
| 6,990,463 B2 * | 1/2006 | Walter | A47F 9/046 235/383 |

* cited by examiner

*Primary Examiner* — Seung H Lee
(74) *Attorney, Agent, or Firm* — Schwegman, Lundberg & Woessner

(57) ABSTRACT

A transaction terminal includes a vertically integrated bagging weigh scale and a vertically integrated scanner. The scale includes two posts that extend horizontally out from the terminal and upon which a bag hangs. Items placed in the bag cause displacement of the posts and/or pressure detected on the posts resulting in a recorded weight by a weight sensor of the scale. A current recorded weight of the bag is reported from the scale to the terminal during a transaction as each item is placed into the bag. The terminal uses the item weights to record prices for those items sold by weight and to verify that items scanned by the scanner and placed in the bag have expected weights for those items.

17 Claims, 5 Drawing Sheets

TRANSACTION TERMINAL WITH VERTICAL WEIGH SCALE AND METHODS OF OPERATION

BACKGROUND

Increasingly consumers and retailers are relying on Self-Service (SS) checkout stations. These stations provide consumers with the ability to self-scan item barcodes, self-weigh produce items, and self-pay for their transactions without the assistance of any store staff. These stations save the retailers in staffing costs by allowing the refocusing of existing staff towards customer attention and experience, and by also improving customer checkout queue wait times by moving customers from cashier-assisted lanes to the SS checkout stations, which is especially beneficial during heavy traffic at the retailer.

However, existing SS checkout stations are bulky and occupy valuable space within the retail stores. Moreover, these stations are challenging to customers attempting to check out with more than just a few items. Customers must place items on an entry shelf, scan the items, and place the items in bags. Typically, all bags must remain on the bag carousel during the checkout process because a bagging scale located under the bag carousel maintains weights for the bags as items are scanned and placed in the bags. Any discrepancy in weights automatically trigger an interrupt at the checkout stations requiring staff to come over, briefly inspect the transaction items, and usually override the interrupt, so that the customer can continue with their transaction at the station.

Furthermore, with produce items, the items must be placed on the scanner/weigh plate by itself and weighed by the station and then removed from the scanner/weigh plate and placed in a bag on the bagging carousel, where weights are again inspected by the station to include the added weight of the already weighed produce item.

Moreover, the combined scanner/weigh plate of existing SS checkout stations is designed to both scan item barcodes from items that do not requiring weighing and weigh produce items. The glass through which the scanner images the item barcodes can be susceptible to spillage damage and can collect debris, which is especially true as produce is placed on the combined scanner/weigh plate. Because of this, retailers often deploy bioptic scanners, which use mirrors and image sensors to scan item barcodes both horizontally (on the plate that also weighs produce items) and vertically to ensure that the item barcode is captured from a variety of angles and ensure that the item barcode can be captured when the horizontal plate is dirty with debris. These combined function devices require a larger space footprint within the stations and are expensive but appear to be a necessity in the industry. Furthermore, the combined function devices are not the most user friendly for wheelchair users, which often requires to add external interface navigation devices in order to meet current disability-accessibility regulations.

SUMMARY

In various embodiments, a transaction terminal with a vertical weigh scale and methods of operation are presented.

According to an aspect, a transaction terminal with a vertically integrated weigh scale is presented. The transaction terminal comprises a vertically integrated scanner. The vertically integrated weigh scale comprises two horizontally extending posts configured to hold a bag on one end and attach to a weight sensor on a different end. As items are identified during a transaction at the transaction terminal and placed in the bag, the vertically integrated scale is configured to report a current weight for the bag having the items to a transaction manager of the transaction terminal for item pricing when needed and item weight security processing during the transaction at the transaction terminal.

DETAILED DESCRIPTION

Figure 1A:
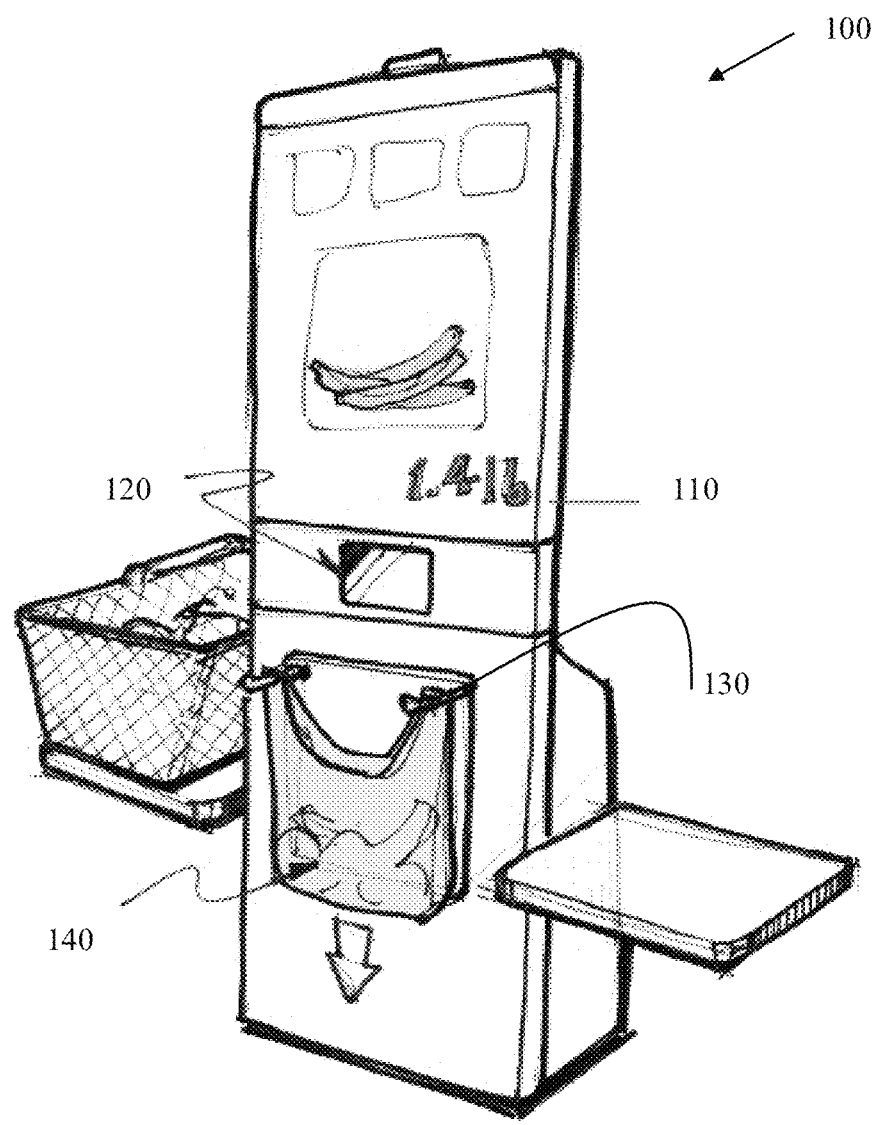
FIG. 1A is a diagram of a transaction terminal with a vertical bagging scale, according to an example embodiment.

FIG. 1A is a diagram of a transaction terminal with a vertical bagging scale, according to an example embodiment. It is to be noted that the components are shown schematically in greatly simplified form, with only those components relevant to understanding of the embodiments being illustrated.

Furthermore, the various components (that are identified in the FIGS. 1A-1D) are illustrated and the arrangement of the components is presented for purposes of illustration only. It is to be noted that other arrangements with more or less components are possible without departing from the teachings of a transaction terminal with a vertical weigh scale and methods of operation presented herein and below.

As used herein "weigh scale" and "bagging scale" may be used interchangeably and synonymously. Further, the terms "customer," "consumer," "user,", and "operator" may be used interchangeably and synonymously herein; these terms refer to an individual that is conducting a transaction to checkout at transaction terminal 100 having an integrated vertical bagging scale 130.

The transaction terminal 100 includes a display 110, a vertically integrated scanner 120, and a vertically integrated bagging scale 130. Terminal 100 also includes a processor and non-transitory computer-readable storage medium having a variety of executable instructions executed by the processor. Similarly, both the bagging scale 130 and the scanner 120 may include their own processors and non-transitory computer-readable storage medium having executable instructions executed by their corresponding processors.

As a consumer scans item for purchase at terminal 100 via the scanner 120, the items are placed in bags 140 that vertically hang from the vertically integrated weigh scale 130. Weights are reported back to a transaction manager 121 (shown in the FIG. 1D). Produce items that require weights during the transaction are placed in a bag 140 and the item weight reported back to transaction manager 121 for a price assignment based on an identified produce type. Existing mechanism to identify the produce type may be used, such as image identification by a camera integrated into terminal 100 and/or customer input through a transaction interface presented on a touchscreen display 110.

Terminal 100 is vertically oriented such that a customer can stand directly in front of terminal 100 and access scanner 120 and touchscreen display 110. Although not shown in FIGS. 1A-1D, terminal 100 also minimally includes a payment card reader, cash accepter and dispenser, coin accepter and dispenser, and receipt printer. Terminal 100 may also include wireless transceivers for Bluetooth® and/or Near Field Communication (NFC).

Conventional SS checkout stations require a large protruding front area that separates the customer from the display and other peripherals such as payment devices and currency/coin acceptors/dispensers. The combines scale/scanner protrudes significantly forward toward the users, which takes away from optimal usability of the station and its peripherals (including touch screen) and occupies valuable retail space. Moreover, when a produce item is purchased, the customer takes at least two steps with conventional stations for placing the item on the combined scanner/scale and then placing the produce item in a bag (where it is weighed a second time for security cross checking).

These issues are solved with terminal 100 and vertically integrated bagging scale 130. The space between the customer and the display 110 is removed and the customer is directly proximate to both vertically integrated scanner 120, bagging scale 130, and display 110 (as well other payment peripherals and currency/coin accepters/dispensers). There is just one step when purchasing produce, which is the customer inserting the produce into a bag 140 that is already hanging from scale 130.

Furthermore, the sensitivity issues associated with horizontal bagging security carrousels are removed with bagging scale 130. Convention weight-checking bagging carrousels have far too many false positives because customers may purchase items that do not cause a bottom of the bag to even reach the weigh plate. Typically, if the weight of an item from an item database is below a predefined threshold, the weight of the purchased item is not even checked because of this issue. Furthermore, customers may place purses or personal effects on the scale causing issues. Because bagging scale 130 hangs vertically items can be dropped into the bag 140 with ease by the customer and weighed. All items (produce and non-produce) can have weights checked against an item weight database for security. The weights are more accurate and less inclined to have any interference by customer personal effects. Once a bag 140 is full, it is removed and placed in customer cart, there is no need to maintain a total weight for all the bags as is typically the case for conventional horizontal bagging carrousels. There is no need to track items from scale to bag and reweigh the items with terminal 100.

As an example, considering the following example transaction. A customer scans an item barcode of a bottle of window cleaner by passing the item barcode across the field-of-view of scanner 120. Bagging scale 130 reports the weight through a weight reporter 136 to transaction manager 121. Transaction manager 121 retrieves weight of that item from the item weight database, which indicates the item weighs 2 lbs. The 2 lbs. expected for the item is checked against the reported weight received from the bagging scale 130 and the item weight is verified assuming the reported weight is within an allowed threshold difference from the expected 2 lbs. Next, the customer scans a can of tuna, the weight addition to bag 140 is reported, transaction manager 121 retrieves the expected item weight from the item weight database as 0.5 lbs. The reported weight for the bag 140 having the window cleaner and the tuna is compared against 2.5 lbs. and if the reported weight for the bag 140 is within a permitted threshold weight of the 2.5 lbs., item verification is obtained. A produce item can simply then be identified through the user-facing interface of transaction manager 121 using touchscreen display 110 by the customer, dropped into bag 140 with the window cleaner and the tuna, the bagging scale 130 reports the total weight, and transaction manager computes the price for the produce item based on the additional weight being reported for the bag when the produce item was inserted into the bag 140.

Figure 1B:
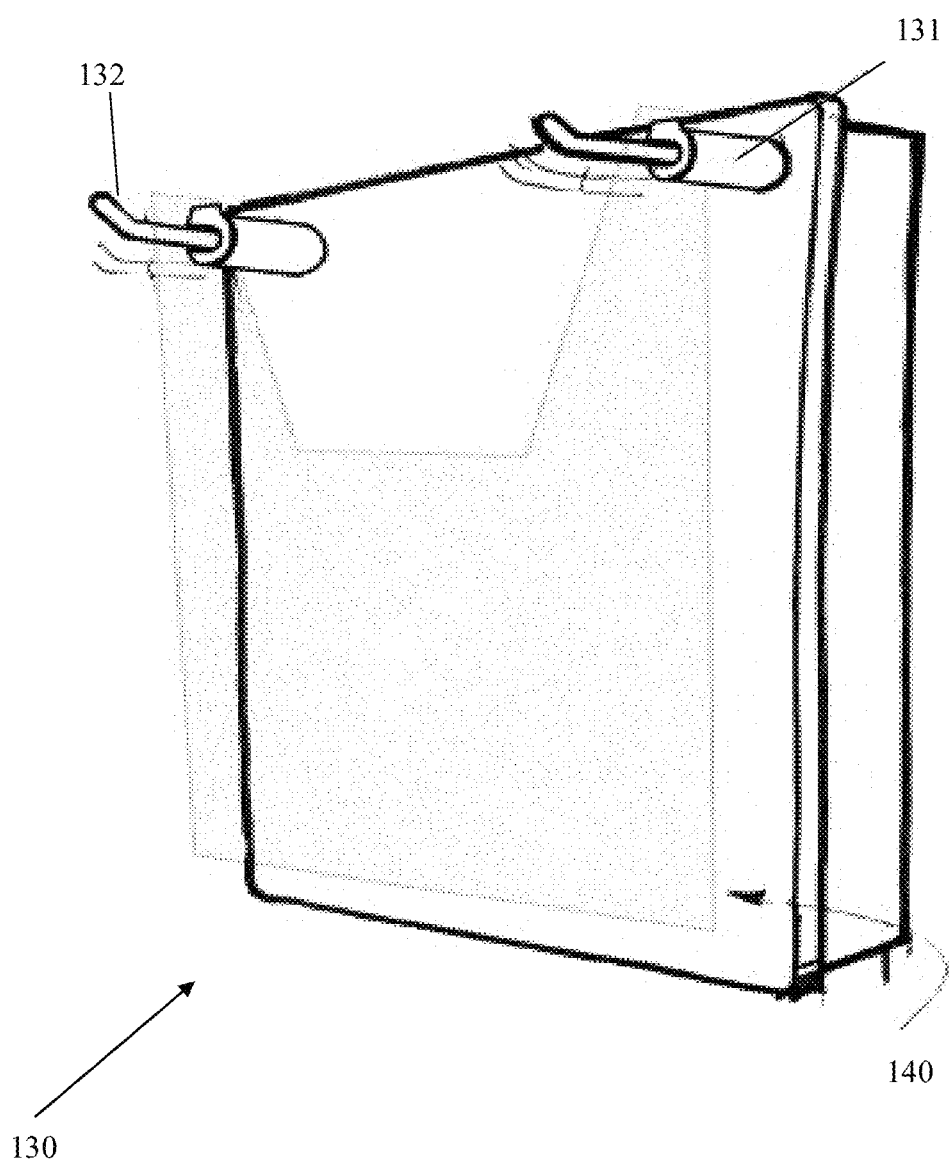
FIG. 1B is a diagram of a front view of a vertical bagging scale, according to an example embodiment.

FIG. 1B is a diagram of a front view and isolated view of a vertical bagging scale 130, according to an example embodiment.

The scale 130 includes tabs 131 and posts 132. Bags 140 freely hang from posts 131, as items are added to bag 140, the posts 132 are pulled by weight of the item downward and weight sensor 133 (shown in FIG. 1C) then records the weight for the bag based on the displacement of or pressure exerted downward on posts 131 from supporting the weight of the bag 140 with the item.

In an embodiment, the scale 130 includes the two horizontal or protruding hook posts 132 using a vertical linear digital scale where weight is measured by sensor 133 as the bag 140 slides down on a rail that measures pressure and translates into a weight for the bag 130.

Figure 1C:
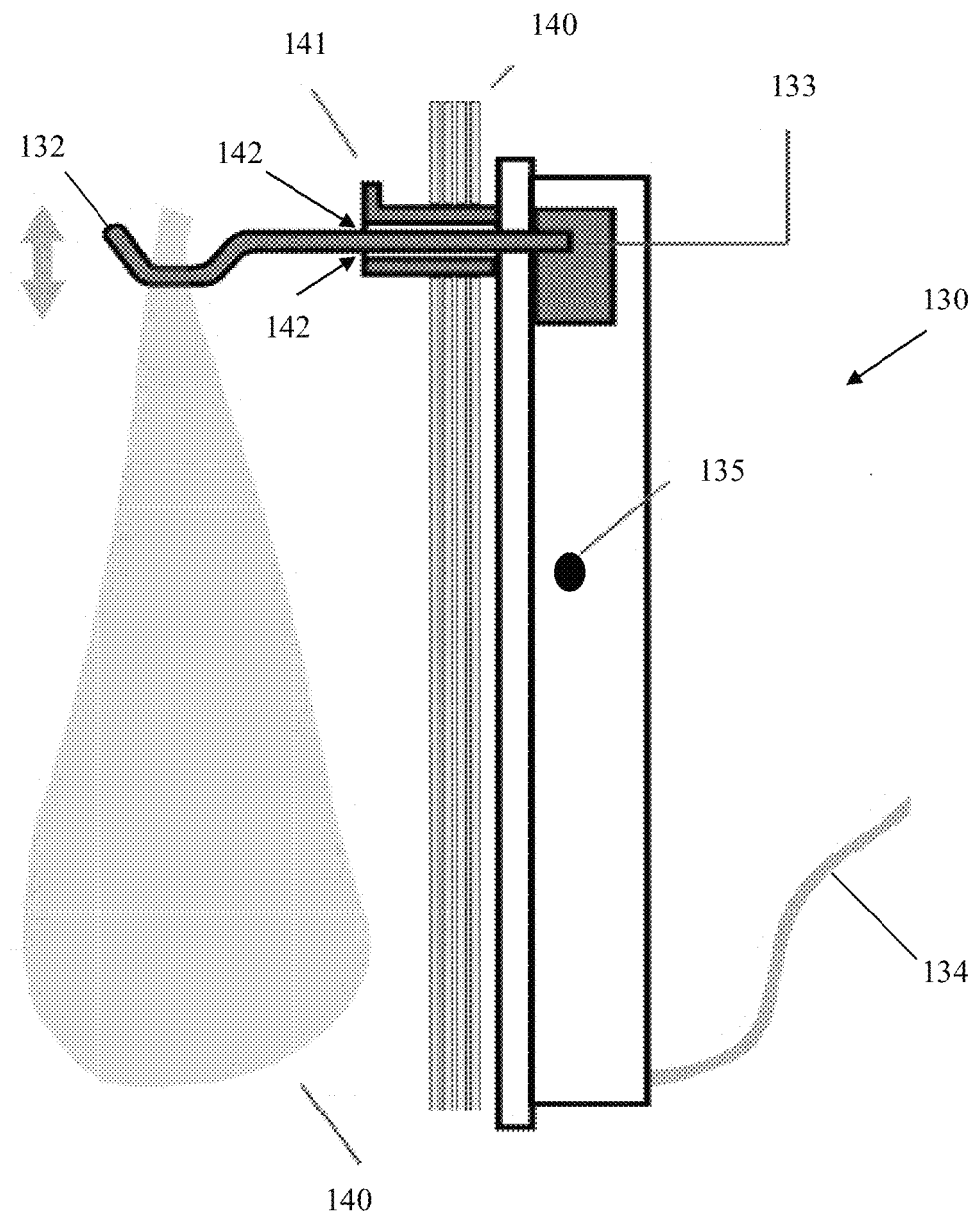
FIG. 1C is a diagram of a cross-sectional view of the vertical bagging scale, according to an example embodiment.

FIG. 1C is a diagram of a cross-sectional view of the vertical bagging scale 130, according to an example embodiment.

Bagging scale 130 includes a bagging assembly that allows a single bag from a collection of bags 140 to be pulled over a bag dispensing hook 141 onto post 132. Dispensing hook 141 includes a space 142 on the top and the bottom to prevent the weight associated with the collection of bags 140 to affect any weight measurement captured by sensor 133 from a bag 140 with items that is on posts 132. That is gap 142 ensures that the weight from the collection of bags is supported by the hooks 141 and does not apply any downward force on posts 132.

A customer pulls a single bag 140 forward over dispensing hook 141 onto post 132, inserts items as scanned by scanner 120 or as produce items are identified from a pick list of produce presented through a transaction interface of transaction manager 121 on touchscreen display 110 for customer selection. Sensor 133 records the weight of just the bag 132 hanging from posts 132 and weights are reported to transaction manager 121 for transaction processing.

Bagging scale 133 reports weights through a connection 134 to terminal 100.

In embodiment, bagging scale 130 also includes a wireless transceiver 135 for reporting wireless tag information, such as when a specialized bag includes a unique identifier, which can be associated with a specific customer and a specific customer account and payment method. In this embodiment, the bag is a reusable bag that may be separately purchased by the customer. This also permits automatic account payment for items of the transaction by the transaction manager 121 using the reported unique bag identifier from wireless transceiver 135. In an embodiment, the wireless transceiver 135 is a Near Field Communication (NFC) or Radio Frequency (RF) transceiver.

In an embodiment, bagging scale 130 may include a security de-tagging or de-activating sensor 135 that automatically deactivates any security tag of an item placed in bag 140 during transaction processing.

In an embodiment, bagging scale 130 includes both a wireless bag transceiver 135 and a secure deactivation sensor 135.

Figure 1D:
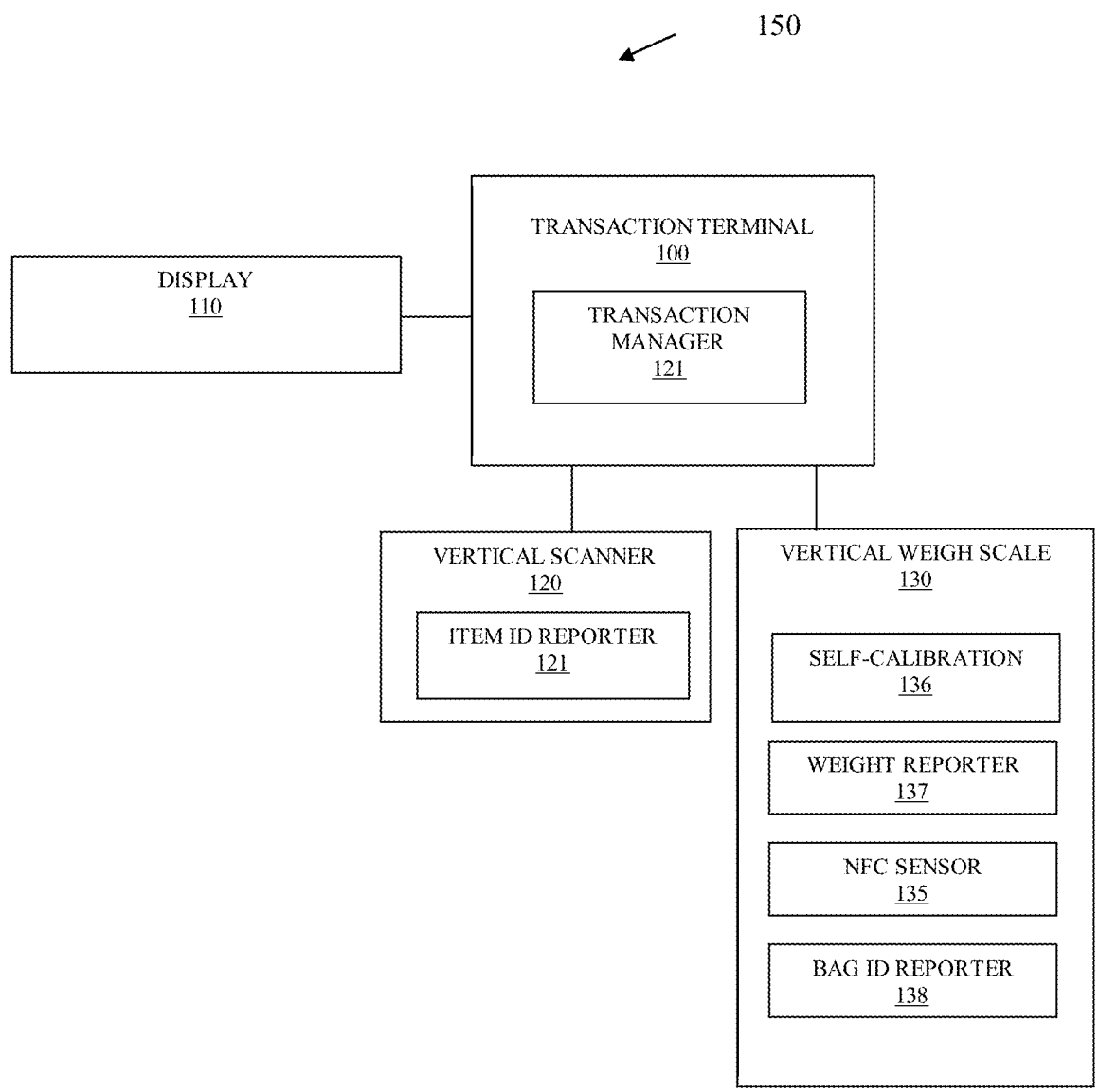
FIG. 1D is a block diagram of components of the transaction terminal having a vertical weigh/bagging scale and a vertical scanner, according to an example embodiment.

FIG. 1D is a block diagram of components of the transaction terminal 100 having a vertical weigh/bagging scale 130, a vertical scanner 120, and touchscreen display 110, according to an example embodiment.

Scale 130 includes processor and non-transitory computer-readable storage media having executable instructions that when executed by the processor performs operations associated with self-calibration 136, a weight reporter 137, and a bag identifier reporter 138. Scale 130 also includes an NFC sensor/transceiver 135.

In an embodiment, self-calibration allows a customer to remove a bag 140 and place a customer's reusable bag onto posts 132. The transaction interface of transaction manager 121 provides an option at the start of a transaction on terminal 100 for the customer to use the customer's provided reusable bag. Customer is then instructed through the interface to remove the supplied bag 140 and place the customer's bag on posts 132. Once the customer confirms that this was done, transaction manager 121 instructs the self-calibration 136 to be processed on scale 130. Self-calibration 136 recalibrates the sensor 133 to report zero weight for the customer's bag. The transaction then begins. Alternatively, customer may (before any item is scanned at terminal 100) remove the provided bag 140 and place the customer's reusable bag on posts 132, weight reporter reports the weight to transaction manager 121. Transaction manager 121 recognizes that no transaction has been initiated, starts a transaction, and ask the customer to confirm that a reusable customer bag was empty and placed on posts 132. Self-calibration 136 is then initiated on scale 130.

Weight reporter 137 reports weights from sensors 133 during the transaction to transaction manager 121. NFC sensor translates wireless bag tags sensed on posts 132 into unique bag identifiers, which bag identifier (ID) reporter 138 reports to transaction manager 121 for embodiments with unique bags linked to customer accounts.

Scanner 120 reports item bar codes read by scanner 120 to transaction manager 121 using an item ID reporter 121.

In an embodiment, the vertical location of display 110 can be adjusted by a customer to raise or lower the height of the display relative to the customer on the terminal 100.

In an embodiment, the vertical location of scale 120 can be adjusted by a customer to raise of lower the height of the scale 120 relative to the customer on the terminal 100.

In an embodiment, the vertical locations of both the display 110 and the scanner 120 can be custom adjusted to a preferred height desired by the customer on terminal 100 together or independent of one another.

In an embodiment, terminal 100 is a Self-Service Terminal (SST), a SS checkout station/terminal, a Point-Of-Sale (POS) terminal operated by a cashier assisting the customer with a transaction checkout, or a kiosk.

These and other embodiments are now discussed with reference to the FIGS. 2-4.

Figure 2:
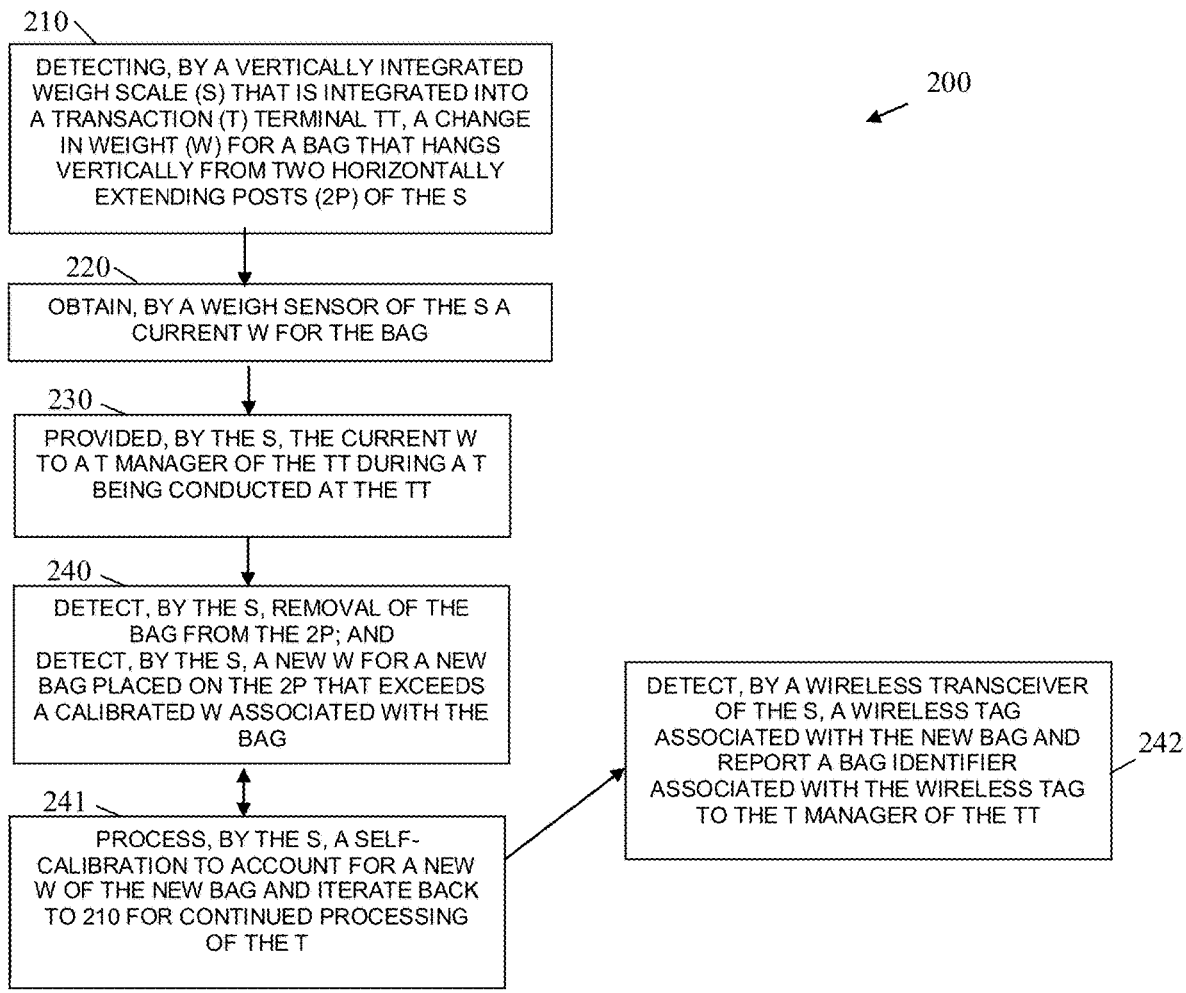
FIG. 2 is a diagram of a method for operating a transaction terminal with a vertical weigh/bagging scale, according to an example embodiment.

FIG. 2 is a diagram of a method 200 for operating a vertically integrated weigh/bagging scale, according to an example embodiment. The software module(s) that implements the method 200 is referred to as a "weigh scale manager." The weigh scale manager is implemented as executable instructions programmed and residing within memory and/or a non-transitory computer-readable (processor-readable) storage medium and executed by one or more processors of a device. The processor of the device that executes the weigh scale manager are specifically configured and programmed to process the weigh scale manager. The weigh scale manager may include one or more connections during operation; any such network connections may be wired, wireless, or a combination of wired and wireless.

In an embodiment, the device that executes the weigh scale manager is vertical weigh scale 130.

The device that executes the weigh scale manager is vertically integrated into a transaction terminal 110. In an embodiment, terminal 110 is an SST, a POS terminal, a kiosk, or a SS checkout terminal.

In an embodiment, the weigh scale manager is all of or some combination of: self-calibration 136, weight reporter 137, and bag ID reporter 138.

At 210, the weigh scale manager detects a change in weight for a bag that hangs vertically from two horizontally extending posts of the vertically integrated weigh scale 130.

At 220, a weigh sensor 133 of the vertically integrated weigh scale 130 obtains a current weight for the bag based on the change in weight detected at 210.

At 230, weigh scale manager provides the current weight to a transaction manager of the transaction terminal during a transaction being conducted at the transaction terminal.

In an embodiment, at 240, the weigh scale manager detects removal of the bag from the two horizontally extending posts and further detects a new weight (through the weigh sensor 133) for a new bag placed on the two horizontally extending posts. The new weight exceeds a calibrated weight associated with the original bag from 210.

In an embodiment of 240 and at 241, the weigh scale manager processes a self-calibration on the vertically integrated weigh scale 130 to account for a new weight of the new bag, and the weigh scale manager iterates back to 210 after calibration waiting for a change in weight for the new bag indicating that an item is added to the new bag during the transaction.

In an embodiment of 241 and at 242, the weigh scale manager detects a wireless tag associated with the new bag and reports a bag identifier associated with the wireless tag to the transaction manager of the transaction terminal during the transaction.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus, the following claims are hereby incorporated into the Description of the Embodiments, with each claim standing on its own as a separate exemplary embodiment.

The invention claimed is:

1. A transaction terminal, comprising:
   a vertically integrated weigh scale;
   wherein the vertically integrated weigh scale comprises
      two horizontally extending posts configured to hold a
      bag on a first end and attached to a weight sensor on a second end, and wherein as items are identified during a transaction at the transaction terminal and placed in the bag, the vertically integrated scale is configured to report a current weight for the bag having the items to a transaction manager of the transaction terminal for item pricing when needed and item-weight security processing during the transaction.

2. The transaction terminal of claim 1 further comprising a vertically integrated scanner have a vertically integrated window situated above a top of the two horizontally extending posts, the vertically integrated scanner configured to capture and report item identifiers from those items having item barcodes as the item barcodes pass in front of the vertically integrated window.

3. The transaction terminal of claim 1 further comprising a bagging assembly integrated behind a rear portion of the two horizontally extending posts.

4. The transaction terminal of claim 3, wherein the bagging assembly includes two hooks configured to allow the bag from a collection of bags to be moved from the rear portion over the two tabs and onto an end portion of the two horizontally extending posts.

5. The transaction terminal of claim 1 further comprising a touchscreen display situated above a top of a vertically integrated scanner, wherein the vertically integrated scanner situated above the two horizontally extending posts.

6. The transaction terminal of claim 1 further comprising, an entry shelf attached to a first side of the transaction terminal and adapted to hold the items before the items are processed at the transaction terminal by the transaction manager.

7. The transaction terminal of claim 6 further comprising, a bag shelf or a basket shelf attached on a second side that is opposite of the first side and adapted to hold the bag or a basket having the bag after items are processed by the transaction manager and weighed by the weight sensor of the vertically integrated weigh sensor.

8. The transaction terminal of claim 1, wherein each of the two horizontally extending posts include a hook on one end adapted to prevent the bag from sliding off the posts as the items are added to the bag.

9. The transaction terminal of claim 1, wherein the vertically integrated scanner further includes a security tag deactivation device adapted to deactivate security tags associated with any of the items when placed in the bag.

10. The transaction terminal of claim 1, wherein the vertically integrated scanner further includes a wireless transceiver adapted to read wireless tags associated with the items or the bag.

11. The transaction terminal of claim 10, wherein the two horizontally extending posts are attached on one end to the weight sensor.

12. A method, comprising:
   detecting, by a vertically integrated weigh scale that is integrated into a transaction terminal, a change in weight for a bag that hangs vertically from two horizontally extending posts of the vertically integrated weigh scale;
   obtaining, by a weigh sensor of the vertically integrated weigh scale a current weight for the bag;
   providing, by the vertically integrated weigh scale, the current weight to a transaction manager of the transaction terminal during a transaction being conducted at the transaction terminal;
   detecting, by the vertically integrated weigh scale, removal of the bag from the two horizontally extending posts, and detecting, by the vertically integrated weigh scale, a new weight for a new bag placed on the two horizontally extending posts that exceeds a calibrated weight associated with the bag, wherein detecting the new weight further includes processing, by the vertically integrated weigh scale a self-calibration to account for the new weight of the new bag and iterate back to the detecting the change in weight for continued processing of the transaction; and
   detecting, by a wireless transceiver of the vertically integrated weigh scale, a wireless tag associated with the new bag and reporting a bag identifier associated with the wireless tag to the transaction manager.

13. A weigh scale comprising:
   two horizontally extending posts attached on one end to a weigh sensor configured to hold a bag and report bag weights to a transaction terminal during a transaction at the transaction terminal when items are placed in the bag;
   a bag assembly configured to hold a collection of bags behind two hooks situated at a rear portion of and above the two horizontally extending posts; and
   a connection wire configured to connect the weigh scale to the transaction terminal;
   wherein the weigh scale is configured to be vertically integrated into a vertical housing of the transaction terminal and connect to a peripheral port of the transaction terminal via the connection wire.

14. The weigh scale of claim 13, wherein each of the two hooks are elevated above a top surface of one of the two horizontally extending posts with gaps to ensure a weight associated with the collection of bags in the bag assemble is not detectable by the weigh sensor and the weight associated with the collection of bags is supported only by the two hooks.

15. The weigh scale of claim 14, wherein the bag assembly is configured to allow a single bag from the collection of bags to be lifted over the two hooks and slid onto the two horizontally extending posts.

16. The weigh scale of claim 13, further comprising: a security tag deactivation device configured to deactivate wireless security tags associated with an item placed into the bag being held on the two horizontally extending posts.

17. The weigh scale of claim 13 further comprising, a wireless transceiver configured to identify a wireless tag integrated into a reusable bag placed on the two horizontally extending posts during the transaction and report a bag identifier associated with the wireless tag to a transaction manager of the transaction terminal during the transaction.

* * * * *